(12) United States Patent
Matheson

(10) Patent No.: US 11,025,811 B1
(45) Date of Patent: Jun. 1, 2021

(54) SYSTEM FOR LIVE STREAMING A TRAIL CAMERA

(71) Applicant: Scott Matheson, Plymouth, WI (US)

(72) Inventor: Scott Matheson, Plymouth, WI (US)

( * ) Notice: Subject to any disclaimer, the term of this patent is extended or adjusted under 35 U.S.C. 154(b) by 0 days.

(21) Appl. No.: 16/732,320

(22) Filed: Jan. 1, 2020

Related U.S. Application Data

(60) Provisional application No. 62/822,430, filed on Mar. 22, 2019.

(51) Int. Cl.
| | |
|---|---|
| *H04N 5/00* | (2011.01) |
| *H04N 5/232* | (2006.01) |
| *A01M 31/00* | (2006.01) |
| *H04N 5/225* | (2006.01) |

(52) U.S. Cl.
CPC ...... *H04N 5/23206* (2013.01); *A01M 31/002* (2013.01); *H04N 5/2252* (2013.01)

(58) Field of Classification Search
CPC ............ H04N 5/23206; H04N 5/2252; A01M 31/002
See application file for complete search history.

(56) References Cited

U.S. PATENT DOCUMENTS

| | | | | |
|---|---|---|---|---|
| 10,001,425 B1* | 6/2018 | Olsson | ................ | G01M 3/005 |
| 10,491,414 B1* | 11/2019 | Weed | ................ | G06F 21/85 |
| 10,784,696 B1* | 9/2020 | Pereira | ................ | G09G 5/10 |
| 2009/0189981 A1* | 7/2009 | Siann | ................ | H04N 7/188 |
| | | | | 348/143 |
| 2010/0045773 A1* | 2/2010 | Ritchey | ................ | H04N 5/2254 |
| | | | | 348/36 |
| 2013/0202274 A1* | 8/2013 | Chan | ................ | H04N 7/185 |
| | | | | 386/362 |
| 2014/0218519 A1* | 8/2014 | Borovinov | ................ | A61G 99/00 |
| | | | | 348/143 |
| 2017/0200296 A1* | 7/2017 | Jones | ................ | G06F 40/58 |
| 2018/0220506 A1* | 8/2018 | Sadwick | ................ | H05B 45/10 |
| 2018/0342329 A1* | 11/2018 | Rufo | ................ | H04L 12/2812 |
| 2019/0020530 A1* | 1/2019 | Au | ................ | H04L 5/0057 |
| 2019/0244498 A1* | 8/2019 | Dumas | ................ | H04W 4/023 |
| 2020/0294401 A1* | 9/2020 | Kerecsen | ................ | G05D 1/0287 |
| 2021/0070441 A1* | 3/2021 | Walsh | ................ | B64C 39/024 |

* cited by examiner

*Primary Examiner* — Zhihan Zhou
(74) *Attorney, Agent, or Firm* — Donald J. Ersler

(57) ABSTRACT

A system for live streaming a trail camera preferably includes a position adjustable camera, a cellular hotspot, a power source, a WiFi switch, a wireless device and a control software program. The position adjustable camera includes being actuated by a motion detector; the capability of being remotely operated; and the ability to live stream images and video including sound. The cellular hotspot converts a cellular signal to a WiFi signal, or a WiFi signal to a cellular signal. The WiFi switch allows operation of the position adjustable camera. The control software program provides an interface between the user and control of the position adjustable camera. The control software program includes choosing between livestream and still images; powering the position adjustable camera; controlling the pan, tilt and zoom of the position adjustable camera; triggering of camera operation; choice of multiple cameras; image inversion; and storage of images in an images gallery.

18 Claims, 2 Drawing Sheets

SYSTEM FOR LIVE STREAMING A TRAIL CAMERA

CROSS-REFERENCES TO RELATED APPLICATIONS

This is a nonprovisional application, which claims the benefit of provisional application No. 62/822,430 filed on Mar. 22, 2019.

BACKGROUND OF THE INVENTION

Field of the Invention

The present invention relates generally to capturing wildlife images and more specifically to a system for live streaming a trail camera, which allows live streaming of wildlife and transmission of the live streaming to a remote location.

Discussion of the Prior Art

The state of the art in trail cameras uses a digital camera, which is triggered by a motion sensor. An animal walks in front of the motion sensor and the digital camera is activated to take a photo or video of the animal. The image or video is stored on an SD card for manual retrieval. Recently, technology has been developed that will transmit the image or video to an email. Additionally, multiple cameras can be connected to a hub, which receives photos or videos from the multiple cameras.

Accordingly, there is a clearly felt need in the art for a system for live streaming a trail camera, which allows live streaming of wildlife, transmission of the live streaming to a remote location and the ability to adjust different parameters of the trail camera, such as pan, tilt and zoom during the live streaming.

SUMMARY OF THE INVENTION

The present invention provides a system for live streaming a trail camera, which allows live streaming of wildlife and transmission of the live streaming to a remote location. The system for live streaming a trail camera preferably includes at least one position adjustable camera, a cellular hotspot, a power source, a WiFi switch, a wireless device and a control software program. However, the WiFi switch is optional. The position adjustable camera includes being actuated by a selectable motion detector; the capability of being remotely operated; and the ability to live stream images and video including sound. The camera includes the ability to be turned on and off; panning 360 degrees; and tilt-trim 120 degrees. The cellular hotspot converts a cellular signal to a WiFi signal, or a WiFi signal to a cellular signal. The power source may be a DC power supply powered by an electrical outlet; a storage battery; or a solar panel and storage battery combination.

The combination of a photocell and a normally closed relay may be used to operate each camera during the day, thus saving battery power. The photocell detects when dusk and sunrise occur. The photocell includes a photocell output. The photocell output provides a voltage high between dusk and dawn, and a voltage low during daytime. The normally closed relay includes a trigger input, a power input and a power output. The photocell output is connected to the trigger of the normally closed relay. A power output of the WiFi switch is connected to a power input of the normally closed relay. The power output of the normally closed relay is connected to a power input of the camera.

The WiFi switch allows operation of the position adjustable camera. The wireless device is preferably a smart cellular phone. The control software program is loaded on to a wireless phone with a platform, such as Android or Apple. The control software program provides an interface between the user and control of the position adjustable camera. The control software program includes choosing between livestream, video recording and still images; powering the position adjustable camera; controlling the pan, tilt and zoom of the position adjustable camera; selectable triggering of camera operation; choice of controlling multiple cameras; image inversion; and storage of images and video in an images gallery.

Accordingly, it is an object of the present invention to provide a system for live streaming a trail camera, which allows live streaming of wildlife.

It is further object of the present invention to provide a system for live streaming a trail camera, which allows transmission of the live streaming to a remote location.

Finally, it is another object of the present invention to provide a system for live streaming a trail camera, which allows different parameters of the trail camera to be adjusted, such as pan, tilt and zoom during the live streaming.

These and additional objects, advantages, features and benefits of the present invention will become apparent from the following specification.

DETAILED DESCRIPTION OF THE PREFERRED EMBODIMENTS

Figure 1:
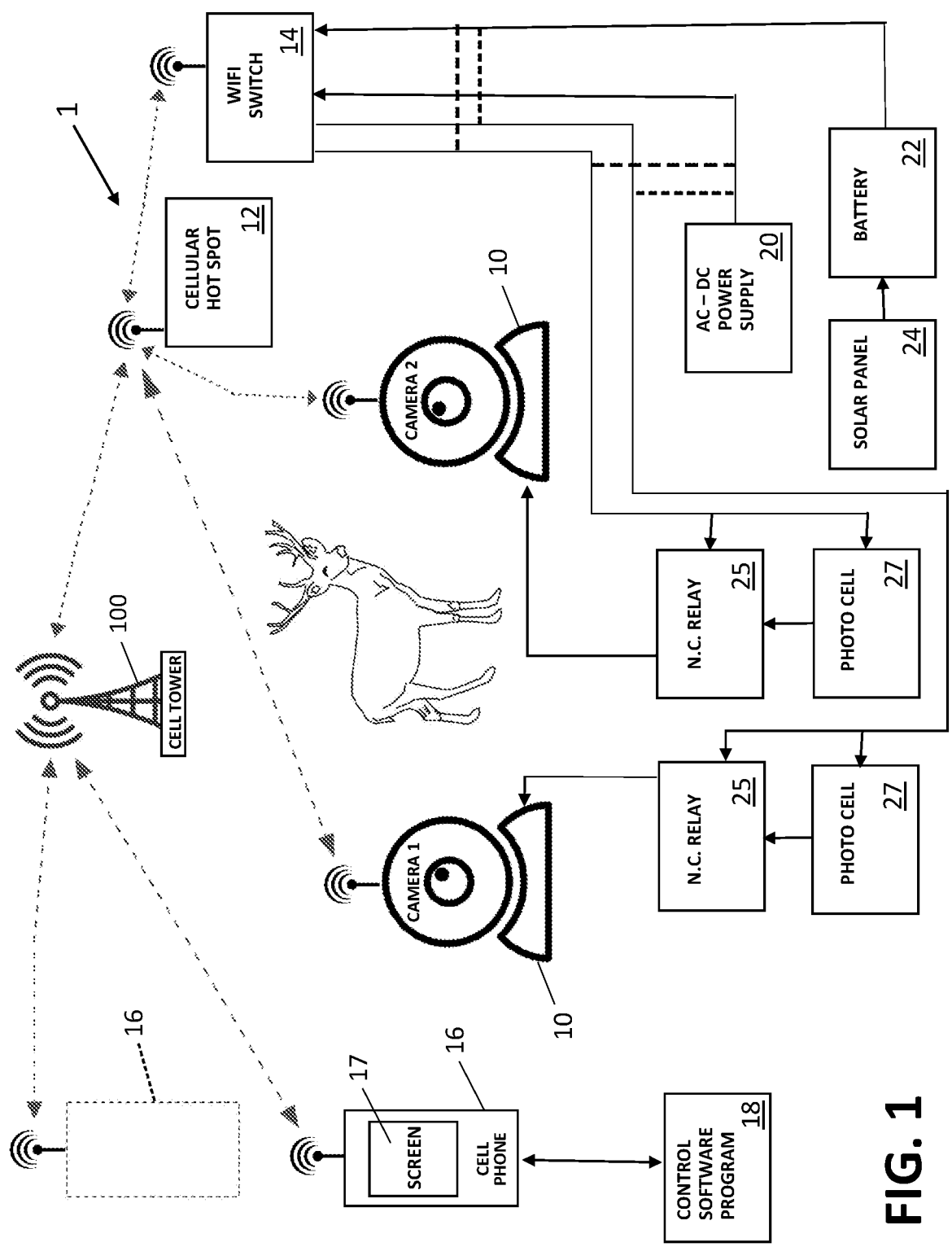
FIG. 1 is a schematic diagram of a system for live streaming a trail camera in accordance with the present invention.

With reference now to the drawings, and particularly to FIG. 1, there is shown a schematic diagram of a system for live streaming a trail camera 1. The system for live streaming a trail camera 1 preferably includes a position adjustable camera 10, a cellular hotspot 12, a power source, a WiFi switch 14, a wireless device 16 and a control software program 18. However, the WiFi switch 14 is optional. The position adjustable camera 10 includes being actuated by a selectable motion detector; the capability of being remotely operated; and the ability to live stream, record images and video including sound. The position adjustable camera 10 includes the ability to be turned on and off; panning 360 degrees; and tilt-trim 120 degrees. The position adjustable camera 10 may also include night vision capability. The cellular hotspot 12 converts a cellular signal to a WiFi signal, or a WiFi signal to a cellular signal. The power source may be an AC-DC power supply 20 powered by an electrical outlet; a storage battery 22; or a combination of a solar panel 24 and the storage battery 22.

The combination of a normally closed relay 25 and a photocell 27 may be used to only power each camera 10 during the day, thus saving battery power. The photocell 27 detects when dusk and sunrise occur. The photocell 27 includes a photocell output. The photocell output provides a voltage high between dusk and dawn, and a voltage low during daytime. The normally closed relay 25 includes a trigger input, a power input and a power output. The photocell output is connected to the trigger of the normally closed relay 25. A power output of the WiFi switch 14 (alternatively the DC power supply 20 or the battery 22) is connected to a power input of the normally closed relay 25. The power output of the normally closed relay 25 is connected to a power input of the position adjustable camera 10. The output of the photocell 27 between dusk and dawn opens the normally closed relay 25, so that the camera 10 is not supplied with electrical power. The normally closed relay is preferably a solid state relay, such as a LCB710, but other relays may also be used. A pin layout of the LCB710 is found at https://article.oemsecrets.com/product-articles/a-nerds-dream, which is hereby incorporated by reference in its entirety. The normally closed relay 25 or any other suitable inverter device inverts the voltage output from the photocell 27 from a voltage high to a voltage low or a voltage low to a voltage high, so the camera 10 is not powered at night.

Figure 2:
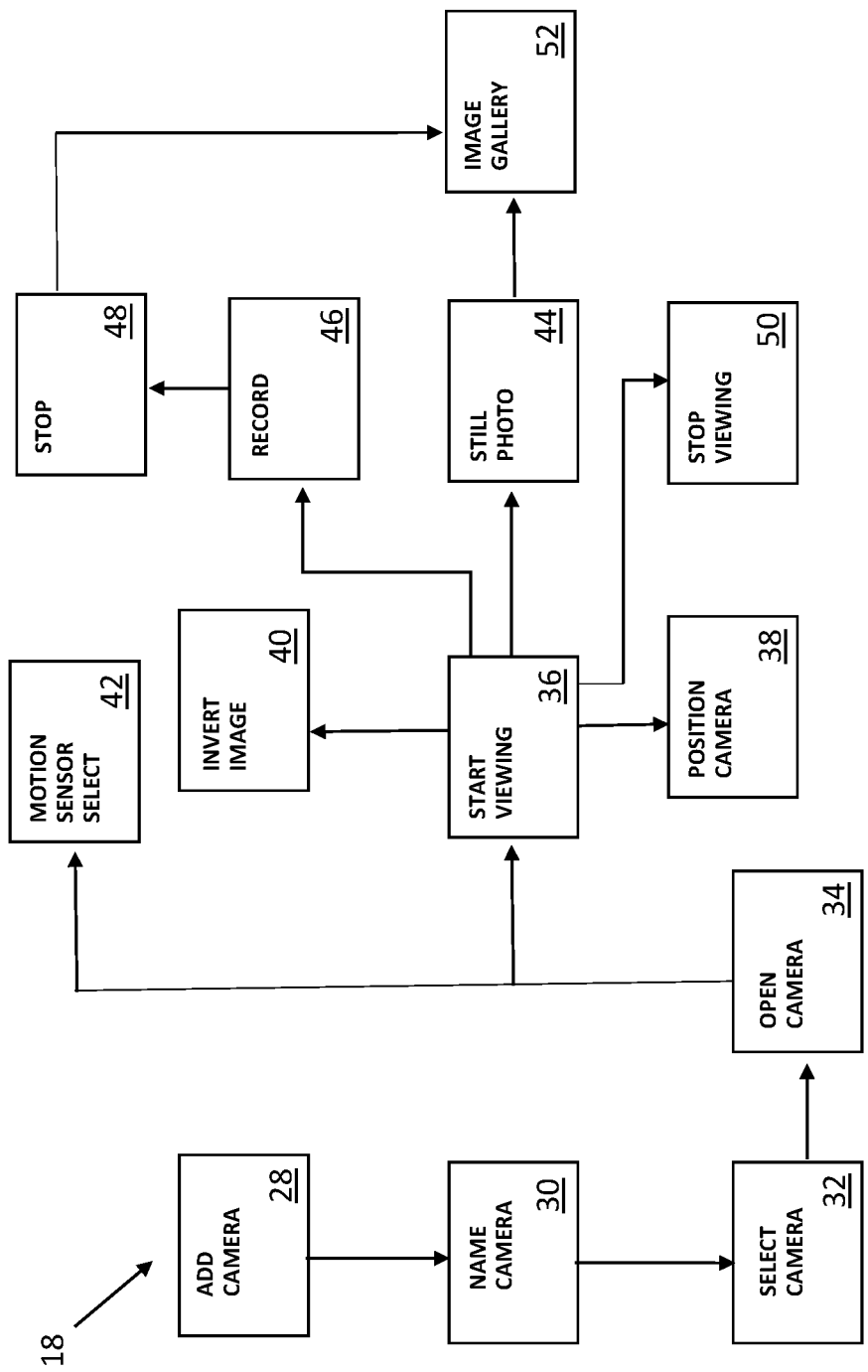
FIG. 2 is a schematic diagram of control software program for a system for live streaming a trail camera in accordance with the present invention.

The WiFi switch 14 allows operation of the position adjustable camera 10. The wireless device 16 is preferably a smart cellular phone. The wireless phone 16 includes a display screen 17. The control software program 18 is loaded on to a wireless phone with a platform, such as Android or Apple. The control software program 18 provides an interface between the user and control of the position adjustable camera 10. The control software program 18 provides interface through a display screen 17 of the wireless phone 16. A photo or video is also displayed on the screen 17. With reference to FIG. 2, the control software program 18 includes the capability of adding at one least camera in box 28 and naming the camera in box 30. A camera is selected from a list of cameras in box 32; and the camera is opened in box 34. A start viewing box 36 is chosen, which provides multiple options for control of the position adjustable camera 10. The position adjustable camera 10 may be panned, tilted, or a lens zoomed in box 38. An image may be inverted in box 40. A motion sensor in the position adjustable camera 10 allows the camera to start recording an image or live streaming upon sensing the presence of an animal. The triggering of a recording by the motion sensor may be activated or deactivated in box 42. The triggering of a recording preferably sends a motion alert notice to the wireless phone 16. Still photos are chosen in box 44; live stream recordings are made in box 46; and the live stream recordings are stopped in box 48. Viewing of images is stopped in box 50. Photographs (still images) are stored in the image gallery 52. Video (recorded) images are stored in the image gallery 52, after the recording is stopped in box 48.

In use, at least one position adjustable camera 10 is placed in an area frequented by animals or potentially traveled by animals. The cellular hot spot 12 is set-up near the at least one position adjustable camera 10. Alternatively, the cellular hot spot 12 may be embedded into the position adjustable camera 10. The cellular hot spot 12 communicates directly with the at least one position adjustable camera 10. The cellular hot spot 12 communicates with a cell tower 100. The user uses their wireless phone 16 to communicate with the at least one position adjustable camera 10 through the cell tower 100 and cellular hot spot 12. More than one wireless phone 16 may be used to communicate with the at least one position adjustable camera 10 at the same time. The cellular hot spot 12 may be created to interface with most cellular carriers, such as Verizon, AT & T, Sprint and the like, or a specific cellular hot spot 12 may be a specific cellular carrier. The cellular hot spot 12 communicates with the WiFi switch 14 to power-up or power-down the at least one position adjustable camera 10. The hot spot 12 and the WiFi switch 14 are powered by the AC-DC power supply 20, the battery 22, or a combination of the battery 22 and the solar panel 24. The user controls the operation of the at least one position adjustable camera 10 with the control software program 18 through the display screen 17 on the wireless phone 16. The at least one position adjustable camera 10, the cellular hotspot 12, the WiFi switch 14, the at least one wireless phone 16, the AC-DC power supply 20, the storage battery 22 and the solar panel 24 are all portable and weather protected.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An outdoor system for live streaming a at least one position adjustable camera through a cell tower to at least one wireless device, comprising:
    said at least one position adjustable camera is located in the outdoors;
    at least one motion detector is connected to said at least one position adjustable camera;
    a cellular hot spot for wireless connection to a cell tower, an electrical power device for supplying electrical power to said at least one position adjustable camera from dawn to dusk, wherein movement of an animal tripping said at least one motion detector, said at least one motion detector sending a control signal to said at least one position adjustable camera to capture an image or a video of the animal, said at least one position adjustable camera sending said image or video through a WiFi signal to said cellular hot spot, said cellular hot spot sending said image or video through the cell tower to the at least one wireless device;
    a control software program for installation on the at least one wireless device, wherein said control software program is capable of providing remote operation of said at least one position adjustable camera; and
    said control software program enables multiple users through multiple cellular phones to access said at least one position adjustable camera at the same time.

2. The outdoor system for live streaming of claim 1 wherein:
    the at least one wireless device includes a display screen for operating functions of said control software program.

3. The outdoor system for live streaming of claim 1 wherein:
    said at least one position adjustable camera includes a motion sensor for triggering a motion alert notice and a photo image.

4. The outdoor system for live streaming of claim 1 wherein:
    each one of said least one position adjustable camera includes the ability to be turned on and off; pan 360 degrees; and tilt-trim 120 degrees.

5. The outdoor system for live streaming of claim 1 wherein:
    said control software program includes the capability of panning and tilting said at least one position adjustable camera;

a lens of said at least one position adjustable camera is capable of being zoomed; and inverting an image.

6. The outdoor system for live streaming of claim 1 wherein:

said control software program includes a gallery for storing images, videos and the capability of building an album in said gallery.

7. The outdoor system for live streaming of claim 1 wherein:

said at least one position adjustable camera being powered with an AC-DC Power supply powered by an electrical outlet; a storage battery; or a combination of said storage battery and a solar panel.

8. The system for live streaming of claim 1, further comprising:

a photocell detects when dusk and dawn occur, an inverter device is used to invert a voltage output of said photocell, a power output of said WiFi switch is connected to said photocell, an output of said inverter device is connected to a power input of said position adjustable camera, wherein said position adjustable camera is powered between dawn and dusk.

9. The system for live streaming of claim 1 wherein:

said cellular hot spot is embedded in said at least one position adjustable camera.

10. An outdoor system for live streaming at least one position adjustable camera through a cell tower to at least one wireless device, comprising:

said at least one position adjustable camera is located in the outdoors;

at least one motion detector is connected to said at least one position adjustable camera;

a cellular hot spot for wireless connection to the cell tower, wherein movement of an animal tripping said at least one motion detector, said at least one motion detector sending a control signal to said at least one position adjustable camera to capture an image or a video of the animal, said at least one position adjustable camera sending said image or video through a WiFi signal to said cellular hot spot, said cellular hot spot sending said image or video through the cell tower to the at least one wireless device;

a control software program for installation on the at least one wireless device, wherein said control software program is capable of providing remote operation of said at least one position adjustable camera, said control software program providing live streaming of an image as seen by said at least one position adjustable camera; and said control software program enables multiple users through multiple cellular phones to access said at least one position adjustable camera at the same time.

11. The outdoor system for live streaming of claim 10 wherein:

the at least one wireless device includes a display screen for operating functions of said control software program.

12. The outdoor system for live streaming of claim 10 wherein:

said at least one position adjustable camera includes a motion sensor for triggering a motion alert notice and a photo image.

13. The outdoor system for live streaming of claim 10 wherein:

each one of said least one position adjustable camera includes the ability to be turned on and off; pan 360 degrees; and tilt-trim 120 degrees.

14. The outdoor system for live streaming of claim 10 wherein:

said control software program includes the capability of panning and tilting said at least one position adjustable camera;

a lens of said at least one position adjustable camera is capable of being zoomed; and inverting an image.

15. The outdoor system for live streaming of claim 10 wherein:

said control software program includes a gallery for storing images, videos and the capability of building an album in said gallery.

16. The outdoor system for live streaming of claim 10 wherein:

said at least one position adjustable camera being powered with an AC-DC Power supply powered by an electrical outlet; a storage battery; or a combination of said storage battery and a solar panel.

17. The outdoor system for live streaming of claim 10, further comprising:

a photocell detects when dusk and dawn occur, an inverter device is used to invert a voltage output of said photocell, a power output of said WiFi switch is connected to said photocell, an output of said inverter device is connected to a power input of said position adjustable camera, wherein said position adjustable camera is powered between dawn and dusk.

18. The outdoor system for live streaming of claim 10 wherein:

said cellular hot spot is embedded in said at least one position adjustable camera.

* * * * *